March 11, 1941. LE ROY M. KUBAUGH 2,234,927
LINK FOR ENDLESS TRACTION BELTS
Filed July 19, 1939
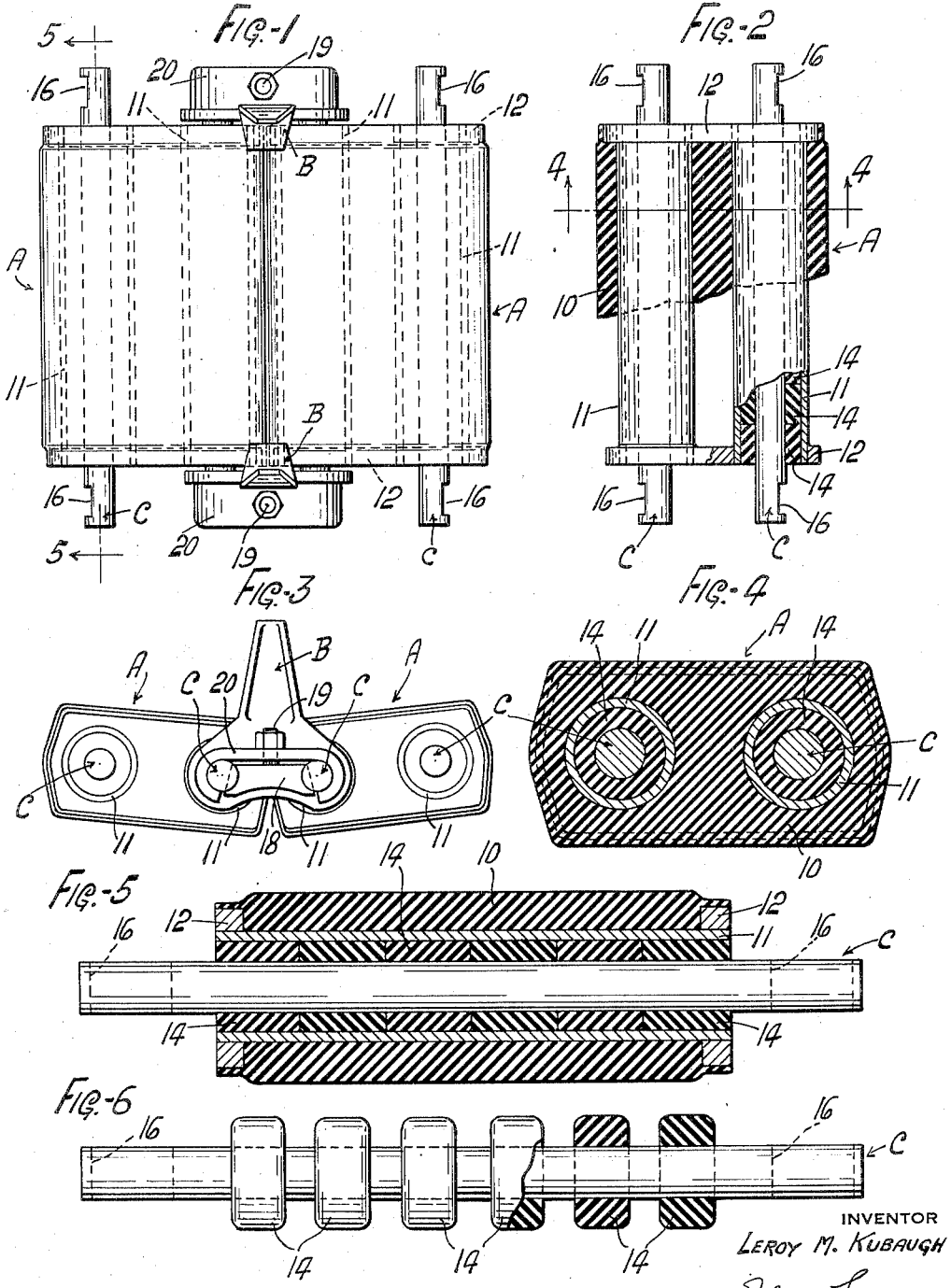
INVENTOR
LEROY M. KUBAUGH
BY Ely + Frye
ATTORNEYS Patented Mar. 11, 1941

2,234,927

UNITED STATES PATENT OFFICE 2,234,927

LINK FOR ENDLESS TRACTION BELTS

Le Roy M. Kubaugh, Akron, Ohio, assignor to The Firestone Tire & Rubber Company, Akron, Ohio, a corporation of Ohio Application July 19, 1939, Serial No. 285,313

3 Claims. (Cl. 305—10)

This invention relates to links for endless traction belts, and more especially it relates to improved links of the rubber shoe type employed for the tracks of track-laying vehicles.

Links of the character mentioned comprise an insert consisting of a pair of parallel spaced metal sleeves connected at their ends by metal webs or end plates, and a rubber structure covering the exterior thereof except the outer lateral faces of the end plates. In the prior construction, the said inserts consisted of metal forgings, the sleeves and webs being of one piece. After the insert was forged, the sleeves required to be drilled or reamed, the axes of the sleeves requiring to be a definite distance apart from each other. Because of shrinkage of the metal, it frequently happened that after being drilled or reamed the walls of the sleeve were of non-uniform thickness, with the result that failure frequently occurred. Furthermore, because the sleeves and webs were made in one piece, it was impossible to obtain a sharp angle at the juncture of sleeves and webs, there being, instead, a substantial radius or fillet at these points, with the result that the webs offered little resistance to the lateral displacement of the rubber when the latter was subjected to compression stress, and separation of rubber and metal was a frequent occurrence. The aforesaid prior construction of the links is shown in Patent No. 2,129,696 of September 13, 1938, to Knox, and it is to the relief of the unsatisfactory features mentioned that this invention primarily is directed.

The chief objects of the invention are to provide an improved link of the character mentioned; to provide a link of such construction is more strongly and efficiently to resist separation of rubber and metal; to provide against the entrance of grit between rubber and metal surfaces; to protect the end plates of the link against abrasion and corrosion; and to provide a construction wherein the strain on the rubber at the ends of the link is relieved. Other objects will be manifest as the description proceeds.

Of the accompanying drawing:

Figure 1 is a fragmentary plan view of the lower reach of a track constructed of links made according to the invention;

Figure 2 is a plan view of a single track link, parts being broken away and in section;

Figure 3 is a side elevation of the structure shown in Figure 1;

Figure 4 is a section, on a larger scale, on the line 4—4 of Figure 2;

Figure 5 is a section, on a larger scale, on the line 5—5 of Figure 1; and

Figure 6 is an elevation of a link pin structure employed in the link, before being mounted therein, a part thereof being in section.

Referring to the drawing, there is shown in Figures 1 and 3 thereof, a short section of a traction belt comprising a pair of the improved links which are designated as a whole by the character A, which links are connected in spaced relation by rigid links B that are mounted upon link pins C that extend transversely through opposite ends of the links A.

The links A are of identical construction, each comprising a block 10 of tough, wear-resisting rubber composition, and a rigid metal frame or insert therein, which insert comprises a pair of spaced, tubular, bearing or sleeve portions 11, 11, and end plates or webs 12, 12 secured to the opposite ends of said sleeves. The said insert or frame is a fabricated structure, in which respect it differs from prior structures of similar nature. In the manufacture of the insert, the end plates 12 are apertured at two points the desired distance apart, the sleeve portions 11 of proper gauge metal are mounted with their ends in the apertures in the end plates, the sleeves and end plates thereafter being welded together to produce a unitary structure. By reason of the fabricated construction of the insert, the walls of the sleeves 11 are of uniform thickness and strength and they intersect the confronting surfaces of the end plates 12 at right angles to provide perpendicular shoulders thereat, there being no appreciable radius or fillets at these points such as was present in prior constructions.

The block or body of rubber composition 10 covers all of the frame or insert except the outer faces of the side plates 12, said rubber being bonded to the insert by vulcanization, and constituting a shoe or tread for resiliently supporting a vehicle. Between the end plates 12 the rubber structure 10 is of greatest width and thickness, and extends substantially beyond the margins of said side plates. Over the margins of the side plates the width and thickness of the rubber structure is reduced so that said margins are covered only by a relatively thin layer of rubber, as is most clearly shown in Figure 5. The arrangement is such as to relieve strains on the rubber at the ends of the block, and at the same time, the covering over the margins of the end plates protects the same against abrasion and corrosion which tends to work in between the rubber and metal, and thus would otherwise destroy the bond therebetween. Because of the perpendicular lateral abutments provided by the end plates, lateral displacement or flow of the rubber under compressive load substantially is prevented.

Mounted within each sleeve 11 of the insert is a link pin C, which link pin is held concentric with the sleeve 11 in spaced relation thereto by a rubber bearing structure consisting of axially aligned sections 14, 14. Each bearing section 14 consists of a rubber collar that is vulcanized to the link pin and which frictionally engages the inner surface of a sleeve 11. Adjacent sections 14 are spaced apart from each other and normally are of substantially larger outside diameter than the inside diameter of the sleeve 11. The link pin C requires to be forced into a sleeve 11, with the result that the bearing sections 14 are subjected to radial stress which deforms them and spreads them laterally until they abut each other, as shown in Figures 2 and 5.

The link pins C project beyond the respective ends of the sleeves 11, and have their projecting end portions tangentially grooved as at 16. In an assembled belt structure the grooves 16 of the pins C of adjacent links receive the wedge shaped head 18 of a bolt 19 that extends through a flange 20 on a rigid link B, to secure adjacent resilient links together in the usual manner.

The invention provides a link of superior wearing qualities and achieves the other advantages set out in the foregoing statement of objects.

Modification may be resorted to without departing from the spirit of the invention, or the scope thereof as defined by the appended claims.

What is claimed is:

1. A link for endless traction belts, said link comprising a body structure of rubber and a metallic insert therein, said insert comprising a unitary structure fabricated from a pair of parallel tubular bearing sleeves joined at their ends to a pair of end plates, said end plates providing sharply defined perpendicular shoulders at their juncture with the sleeves, said body structure being vulcanized to the insert after fabrication thereof at all points of contact therewith.

2. A link for endless traction belts, said link comprising a body structure of rubber and a fabricated metallic insert therein, said insert comprising a unitary structure made up of a pair of parallel tubular bearing sleeves having their end portions received in apertures formed in a pair of end plates, said end plates being welded to the sleeves and providing sharply defined perpendicular shoulders at their juncture with the sleeves, said body structure being vulcanized to the insert after fabrication thereof at all points of contact therewith.

3. A link for endless traction belts, said link comprising a unitary fabricated metal frame or insert consisting of parallel tubular bearing sleeves united at their opposite ends with a pair of end plates that define perpendicular shoulders at the ends of the sleeves, and a rubber structure vulcanized to said frame after fabrication of the latter and at all points of contact therewith and completely covering said frame except the outer lateral faces of said end plates, said rubber structure being of greatest width and thickness between the end plates, the thickness of the rubber structure being reduced over the margins of the end plates.

LE ROY M. KUEAUGH.